United States Patent [19]

Meyer

[11] Patent Number: 4,819,000

[45] Date of Patent: Apr. 4, 1989

[54] SCANNING ANTENNA HAVING AMPLITUDE AND PHASE DISTRIBUTION DIVERSITY

[75] Inventor: Maurice A. Meyer, Natick, Mass.

[73] Assignee: Micronav Ltd., Canada

[21] Appl. No.: 83,246

[22] Filed: Aug. 10, 1987

[51] Int. Cl.[4] .......................... G01S 1/16; H01Q 3/02
[52] U.S. Cl. ..................................... 342/408; 342/374
[58] Field of Search ............................... 342/374, 408

[56] References Cited

U.S. PATENT DOCUMENTS

| | | | |
|---|---|---|---|
| 3,531,803 | 9/1970 | Rosen et al. | 342/374 |
| 3,680,113 | 7/1972 | Dorier et al. | 342/374 |
| 3,816,830 | 6/1974 | Giannini | 342/374 |
| 3,922,685 | 11/1975 | Opas | 342/374 |
| 4,041,501 | 8/1977 | Frazita et al. | 342/408 |
| 4,100,548 | 7/1978 | Hemmi et al. | 342/374 |
| 4,257,050 | 3/1981 | Ploussios | 342/374 |
| 4,306,238 | 12/1981 | Enein | 342/408 |
| 4,387,378 | 6/1983 | Henderson | 342/374 |
| 4,451,831 | 5/1984 | Stangel et al. | 342/374 |
| 4,489,325 | 12/1984 | Bauck et al. | 342/374 |
| 4,499,472 | 2/1985 | Willett | 342/374 |
| 4,625,211 | 11/1986 | Searle et al. | 342/374 |
| 4,626,858 | 12/1986 | Copeland | 342/374 |
| 4,635,064 | 1/1987 | Chisholm | 342/408 |
| 4,723,126 | 2/1988 | Chisholm | 342/408 |

Primary Examiner—Theodore M. Blum
Assistant Examiner—David Cain
Attorney, Agent, or Firm—Charles Hieken

[57] ABSTRACT

A scanning beam transmit antenna system includes a source of electromagnetic energy, radiating elements and a feed network connecting the source to the radiating elements. A beam steerer controls the phase of the electromagnetic energy at each of the radiating elements. Power dividers route the electromagnetic energy to each of the radiating elements, and switches control the flow of the electromagnetic energy among the power dividers. The beam steerer changes the phases of the energy emitted by the radiating elements as a function of time to cause sequentially a motion of the scanning beam in the "TO" direction and a motion of the scanning beam in the "FRO" direction, and the switches modify the flow of the electromagnetic energy through the power dividers to and among the radiating elements on one half of the linear array during the "TO" motion of the scanning beam and to the radiating elements on the other half of the linear array during the "FRO" motion of the scanning beam. A microwave network feeds a linear array of radiating elements with a prescribed amplitude and phase characteristic, which can be translated along the array a distance equal to a preselected integral number of elements by the action of a single microwave switch.

13 Claims, 7 Drawing Sheets

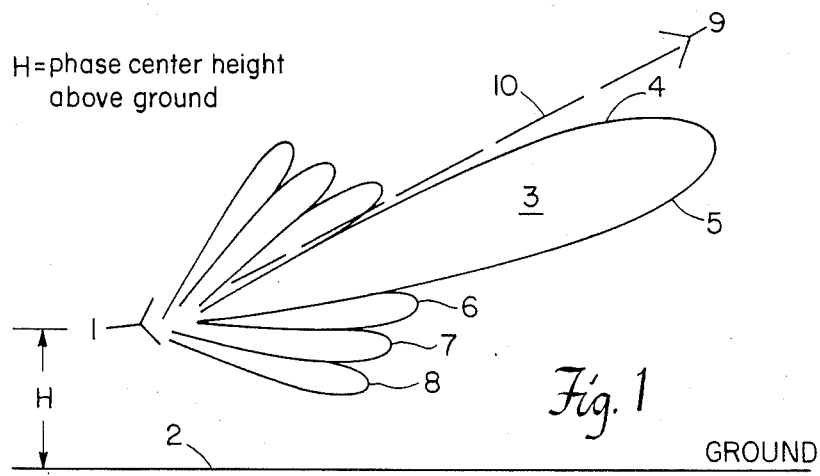
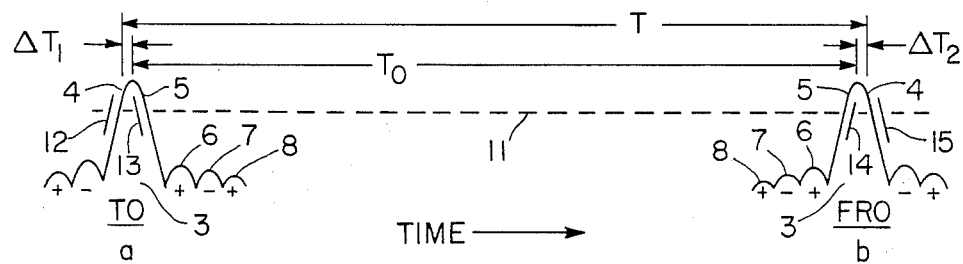
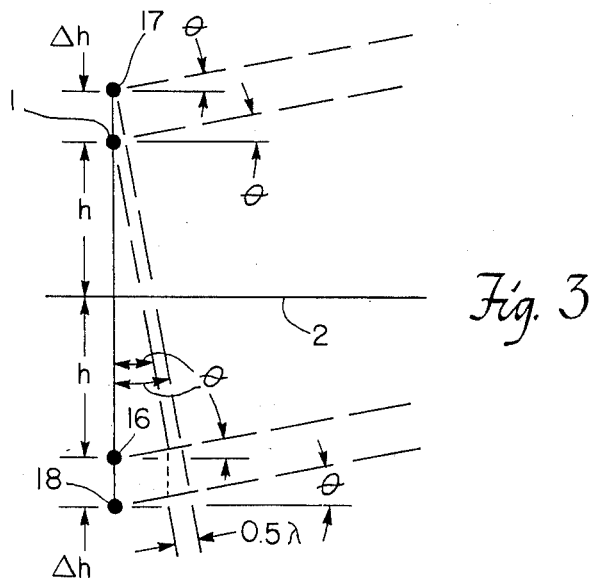

SCANNING ANTENNA HAVING AMPLITUDE AND PHASE DISTRIBUTION DIVERSITY

This invention relates to electromagnetic radiation by scanning beam antennas, and in particular to a technique for reducing the effects of radiation reflections that add vectorially to the direct path radiation.

The art within which this invention arose is the microwave scanning beam art, such as that associated with the international microwave landing system (MLS). It represents an improvement to the invention described by patent application Ser. No. 925,166 filed Oct. 31, 1986, by Cafarelli and Adams.

In time reference scanning beam systems, such as the MLS, the angular position of the transmitted beam centroid normally is determined by measuring the times that the leading and trailing edges of the beam illuminate the receiver antenna, and calculating the average. These measurements can be contaminated by mainlobe segments or be sidelobes of the transmitted pattern being reflected onto the mainlobe measurement threshold, either from the ground or from some object such as a hangar. This measurement error has an adverse effect on system performance. The inherent nature of the relationship of the direct mainlobe energy and both main and sidelobe reflected energy, is such that in the MLS an early time measurement error in the "TO" scan of a "TO" - "FRO" scan pair, is accompanied by a late time measurement error in the "FRO" scan, and vice-versa. The aircraft receiver decodes the angular position of the beam illuminating the aircraft by the measurement of the time between the "TO" beam passage and the "FRO" beam passage, where the "TO" beam scan sweeps from the start position to the maximum scan angle while the "FRO" beam scan returns the beam to the start position. Thus, the "TO" error adds to the "FRO" error. The resulting additive error can cause undesirable flight path deviations, and undesirable motions of the aircraft control surfaces when the MLS is coupled to the autopilot for aircraft approach and landing.

The current approach to this additive error problem is to reduce the amplitude of the sidelobes relative to the mainlobe. This can be accomplished in a linear phased array antenna by providing preferred amplitude distributions among the radiating elements, or by individual element directivity, or by phasing element groups to provide a sub-array directivity. The amplitude distribution approach degrades both the directivity and gain of the mainlobe. However, these degradations normally are accepted in order to achieve the attendant reduction in side lobe levels. For example, a cosine amplitude taper reduces the first sidelobe level to −23 dB, but increases the beamwidth of the mainlobe by about 37 percent. A cosine-squared taper reduces the first sidelobe level to −31.7 dB, with a beamwidth increase of a considerable 66 percent. There are other distributions with more desirable pattern characteristics, such as the Dolph-Chebyshev, that "optimizes" the beamwidth for any selected sidelobe level. However, all sidelobe levels are equal for this distribution, which results in a waste of total energy and a corresponding decrease in gain, even for the optimized beamwidth. The Taylor line source, a modification of Dolph-Chebyshev, tapers the sidelobe pattern envelope providing some control over the mainbeam gain. The invention described by this application retains the advantages achieved by these aperture distributions, while reducing the adverse effects of the residual sidelobes.

Reducing the sidelobe levels by providing element directivity has theoretical merit, but would require element dimensions that would be unwieldly. Electronically packaging the radiating elements into groups, as described by Hazeltine U.S. Pat. No, 4,041,501, provides the sub-element array that reduces the sidelobe amplitudes. However, that antenna is mechanically quite complex, having long RF paths that could be sensitive to temperature and frequency changes.

This invention reduces the MLS error caused by radiation reflections into the mainlobe by reducing both the actual and effective levels of the reflected radiation. The reduction is attained regardless of the characteristics and locations of the reflecting surfaces, and whether the reflections are specular or diffuse. However, for descriptive clarity, the descriptions and drawings will emphasize specular ground reflections in the vertical plane for the MLS elevation (EL) antenna. The same results would be obtained for diffuse reflections from the EL antenna, and for lateral reflections from the MLS azimuth (AZ) antenna.

An important aspect of this invention is to cause the reflection induced error during the "TO" scan to cancel rather than add to the error induced during the "FRO" scan. This is accomplished by changing the antenna phase center height between scans, while retaining a preferred amplitude distribution across the array. This height change alters the path length difference between the direct and reflected signals, from the transmit to the receive antenna. When the path length difference change corresponds to a half wavelength, reflected signals that previously added to, now would subtract from, the direct signal. This causes the reflection-induced error in the beam centroid position to move in the same direction during the "TO" and FRO" scans and thus have no effect on the time difference between the "TO" and "FRO" beam centroids. Thus the phase center height diversity of the EL antenna between scans will cause the "TO" scan error to cancel rather than add to the "FRO" scan error, negating the adverse error inducing effect of the reflection. An alternate approach is to jump the phase center height between scan pairs, and then average the calculated angle of the airborne antenna relative to the average phase center height of the ground antenna.

Numerous other features, objects and advantages will become apparent from the following specification when read in conjunction with the accompanying drawings in which:

FIG. 1 is a polar coordinate view of a scanning beam;

FIG. 2 is a cartesian coordinate view of a scanning beam, that illustrates the source of sidelobe activated error;

FIG. 3 illustrates the geometry associated with changing the phase of the reflected sidelobe energy;

Figure 4:
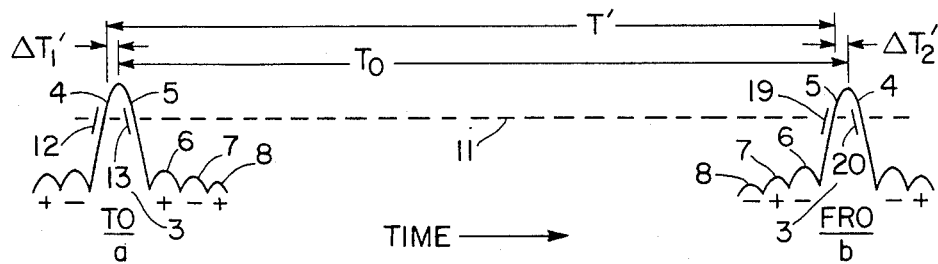
FIG. 4 illustrates the effect of sidelobe phase changes on the effective sidelobe activated error.

With reference now to the drawings, it is noted and emphasized that the phases of the sidelobe energy shown by FIGS. 2 and 4, are the phases relative to the mainlobe, when this reflected sidelobe energy arrives at the mainlobe measurement threshold. A vertical crossection of an antenna pattern radiated by an MLS elevation (EL) antenna is illustrated by FIG. 1, which shows the phase center 1 of the EL antenna over ground plane 2 radiating scanning beam 3 having an upper edge 4 and a lower edge 5, and with sidelobes 6, 7, and 8. It also shows aircraft antenna 9 positioned on glide slope 10. The upper edge 4 is the leading edge of scanning beam 3 during the "TO", or upward scan and the trailing edge during the "FRO", or downward scan.

Conversely, the lower edge 5 is the leading edge during the "FRO", or downward, scan and the trailing edge during the "TO", or upward scan. The "TO" and "FRO" scans of the MLS EL antenna are illustrated in cartesian format by FIG. 2. The centroid measurements, to determine the exaxt time that the midpoint of the scanning beam illuminates the airborne antenna, are made at a nominal level, typically −3 dB, identified as measurement threshold 11 and shown as the dashed line on that figure. When sidelobe energy does not contaminate the mainlobe at its measurement threshold 11, then the time difference at the aircraft antenna 9 between the passage of the "TO" and "FRO" beams is $T_o$, which is a measure of the angular position of the aircraft antenna 9 relative to the phase center 1 of the EL antenna. When the sidelobes of the EL antenna are reflected by ground plane 2 into the measurement threshold 11 of the mainlobe, a distortion of the mainlobe occurs. During the "TO" scan, a time measurement error $\Delta T_1$ ensues, and during the "FRO" scan a time measurement error $\Delta T_2$ occurs. These errors are additive, as explained in subsequent paragraphs.

It is important to note that mathematically the reflections can be treated as signals emanating from an image antenna located below the surface, as will be shown and described when FIG. 3 is discussed. It is also noted that all calculations in this application assume that the phase center 1 of the EL antenna and airborne antenna 9 are separated by a distance sufficient to geometrically assume that radiation from the real EL antenna and from its image are parallel. If not parallel, the described invention remains valid, but the optimum displacement of the EL antenna phase center 1 from scan-to-scan also becomes a function of range.

Referring again to FIG. 2, the reflection-induced errors associated with the "TO" and "FRO" scans are additive for the following reasons: When leading edge 4 of the "TO" scan illuminates aircraft antenna 9 as shown by FIG. 2A, that antenna also will be illuminated by the ground-reflected plus-phase energy from sidelobe 6. Note again that when the radiation is reflected from the ground at near grazing angles, it undergoes a substanstial phase reversal. Thus, a minus-phase sidelobe in free space becomes, upon reflection, a plus-phase contaminant. This resulting plus-phase energy from sidelobe 6 will add vectorially to the mainlobe energy, resulting in an early measurement of its leading edge at measurement threshold 11. When the trailing edge 5 of the "TO" scan reaches the airborne antenna 9, that antenna also will be illuminated by the reflected minus-phase sidelobe 7 which is contiguous to sidelobe 6. The reason that the reflection region moved to the contiguous sidelobe is that the angular distance between corresponding points on contiguous sidelobes is about one beamwidth of the mainlobe at measurement threshold 11. The minus-phase reflected energy from sidelobe 7 subtracts from the mainlobe energy at the trailing edge of the "TO" beam, also resulting in an early measurement. Accordingly, the beam centroid, being defined as half-way between the leading and trailing edge measurements, would have an undetectable negative time error. The term "undetectable error" means the airborne receiver has no method or information to determine that the measurement does not represent true angular position in the ground antenna coordinate system.

Consider now the "FRO" or downscan of the MLS EL scanning beam, as illustrated by FIG. 2B. When the aircraft antenna 9 is illuminated by the leading edge 5, its antenna also is illuminated by the minus phase reflection from sidelobe 7. Note that the mainlobe and sidelobe positions are identical when the aircraft antenna 9 is illuminated by the leading edge 5 of the downscan and the trailing edge 5 of the upscan. The mainlobe and sidelobe positions also are identical when the aircraft antenna 9 is illuminated by the trailing edge 4 of the downscan and the leading edge 4 of the upscan. Thus, the undetectable error in the centroid position measurement during the downscan is a positive time error. The two centroid timing errors, negative for upscan and positive for downscan, result in an undetectable additive time difference error which translates into an undetectable additive angle error.

In order to avoid beam overlap in the transition region between the "TO" and FRO" scans, a pause time between the scans is provided by the standard signal format.

An important aspect of this invention is to provide phase reversal of the reflected energy during the "FRO" scan, as compared to the reflected energy during the "TO" scan. This can be accomplished by vertically displacing the phase center of the antenna between scans as illustrated by FIG. 3. The phase center can also be vertically displaced between scan pairs, or among groups of scans, and reflection error effect compensation occurs by receiver averaging or filtering. In its present and normal configuration, the phase center 1 of the EL antenna remains at height h above ground plane 2 for all scans, and its image 16 remains at distance h below ground plane 2. The sidelobe energy reflections will either add to or subtract from the mainlobe, depending upon the glideslope angle $\theta$ and phase center height h. Referring to FIG. 3, when the phase center height is raised by an amount $\Delta h$ to position 17, its image will move to image position 18 such that the path length of the reflected signal is changed by $0.5\lambda$, where $\lambda$ is the wavelength of the radiation, and there will be a 180 degree reversal of the phase angle of the reflected sidelobes. Total reversal is achieved when $\Delta h = \lambda/(4 \sin \theta)$.

Referring now to FIG. 4A, the "TO" scan occurs with the EL antenna phase center height at h, resulting in the same negative undetectable error as in FIG. 2A. However, during the "FRO" scan, the EL antenna phase center height is raised to $h + \Delta h$ (or lowered to $h - \Delta h$), thus reversing the phase of all reflected sidelobes relative to the mainlobe, as compared to the phase during "TO" scan. Thus it is a plus-phase reflection of sidelobe 7 that contaminates the leading edge 5 of mainlobe 3, and a minus-phase reflection of sidelobe 6 that contaminates its trailing edge. The result, illustrated by FIG. 4B, is a negative undetectable time error in the beam centroid measurement. The total sidelobe activated error thus will be the difference between the "TO" and "FRO" errors, rather than the sum as occurs with the conventional system. The improvement is considerably greater than an order of magnitude, and by proper selection of parameter values could be greater than 30 dB.

It is important to note that the optimum change in phase center height $\Delta h$ is a function only of wavelength $\lambda$ and glideslope angle $\theta$, and not as a function of phase center height h. Accordingly, in a simple embodiment $\Delta h$ would be a constant, and selected to accommodate the preferred glideslope angle.

A more advanced embodiment would provide for a $\Delta h$ as a function of mainlobe pointing angle during either or both the "TO" and FRO" scans, such that the slidelobe activated errors would be in the cancellation direction at all glideslope angles.

The antenna pattern structure formed by a uniformly illuminated aperture would represent the simplest embodiment of this improvement, since movement of the phase center height would not disturb the amplitude distribution among the antenna elements. While the first sidelobes would be only about 13 dB below mainlobe, these normally do not reflect into the mainlobe. With the illustrated parameter values, only the 4th and higher angle sidelobes could reflect into a 1° beamwidth mainlobe at a 3° glideslope angle. At this angle, it can be calculated from the $\Delta h$ equation that the $\Delta h$ required to minimize the effect of sidelobe reflections at C-band is about 1 ft., a convenient value for implementation.

Figure 5:
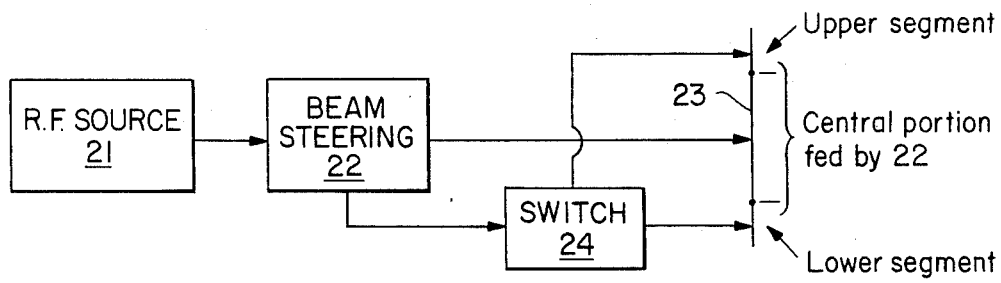
FIG. 5 shows a block diagram of an antenna system incorporating controlled phase center diversity.

The block diagram for phase center height diversity with uniform aperture illumination is shown by FIG. 5. A signal generated by radio frequency source 21 provides the input to beam steering unit 22, which generates the phases of the signals that are routed to the radiating elements of antenna 23. The center portion of antenna 23 is driven directly by beam steering unit 22, and the upper and lower portions are driven selectively by routing a portion of the signal through radio frequency switch 24 alternately to the upper and lower segments of antenna 23. The arrangement of components illustrated by FIG. 5 is particularly applicable to radiation patterns formed by a uniform illumination of the antenna 23 aperture.

Figure 6:
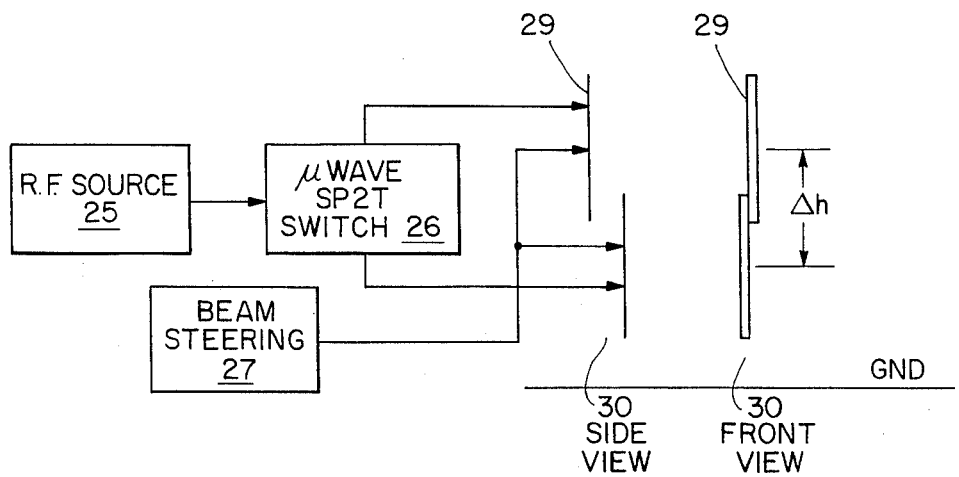
FIG. 6 shows a method for displacing an amplitude distribution.

In the event that it is desired to provide a lower actual sidelobe level, along with the advantages of phase center diversity, the scanning beam must be formed by providing a nonuniform amplitude distribution to the radiating elements. A feasible, but not necessarily an efficient configuration is illustrated by FIG. 6.

In this configuration an r.f. source 25 feeds one of two antennas 29 and 30 thru single-pole double-throw microwave switch 26. The antennas are complete phased arrays with a common beam steering unit and are displaced vertically a height $\Delta h$ chosen for the application.

Figure 7:
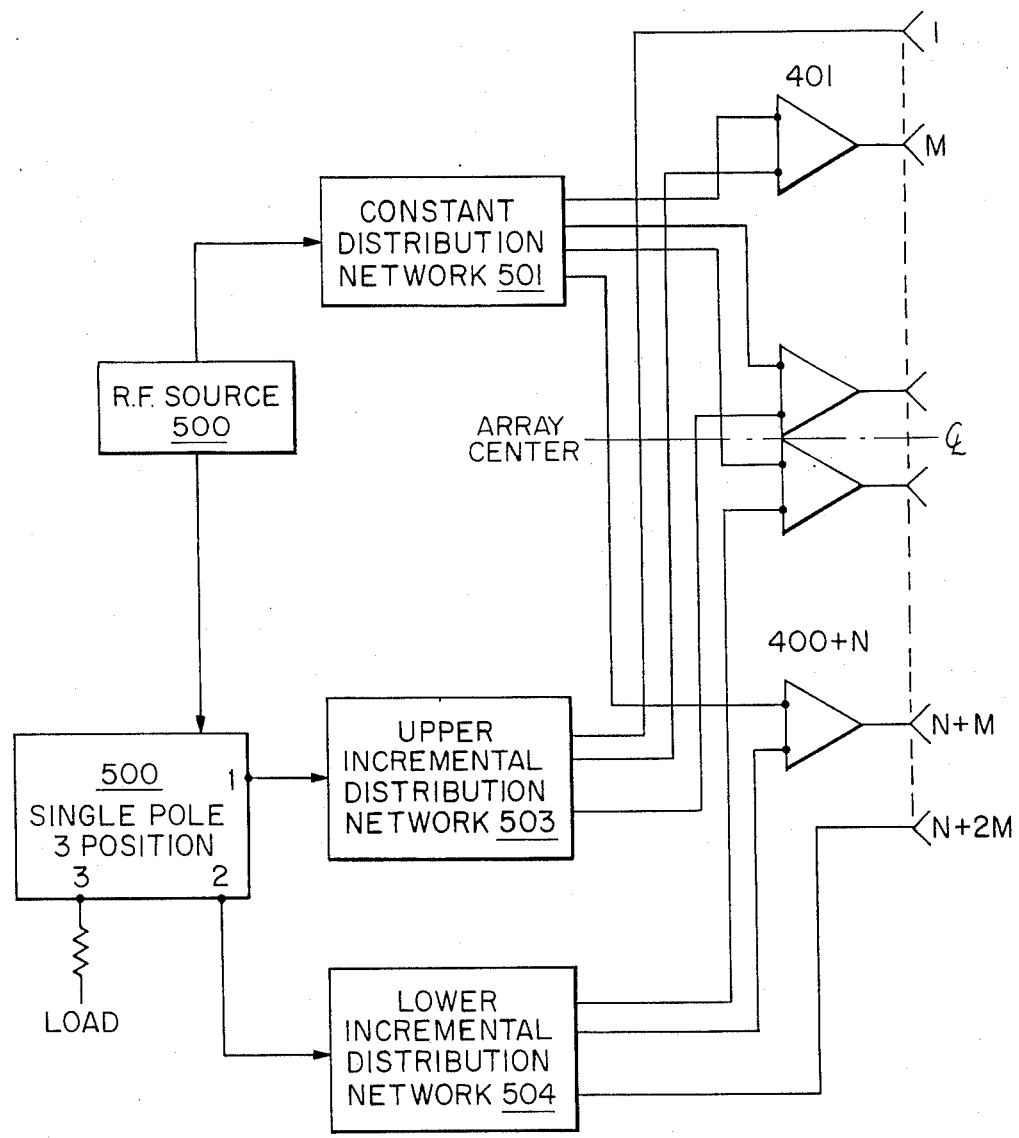
FIG. 7 shows a subcombination of the switched phase center array of FIG. 11.
Figure 8:
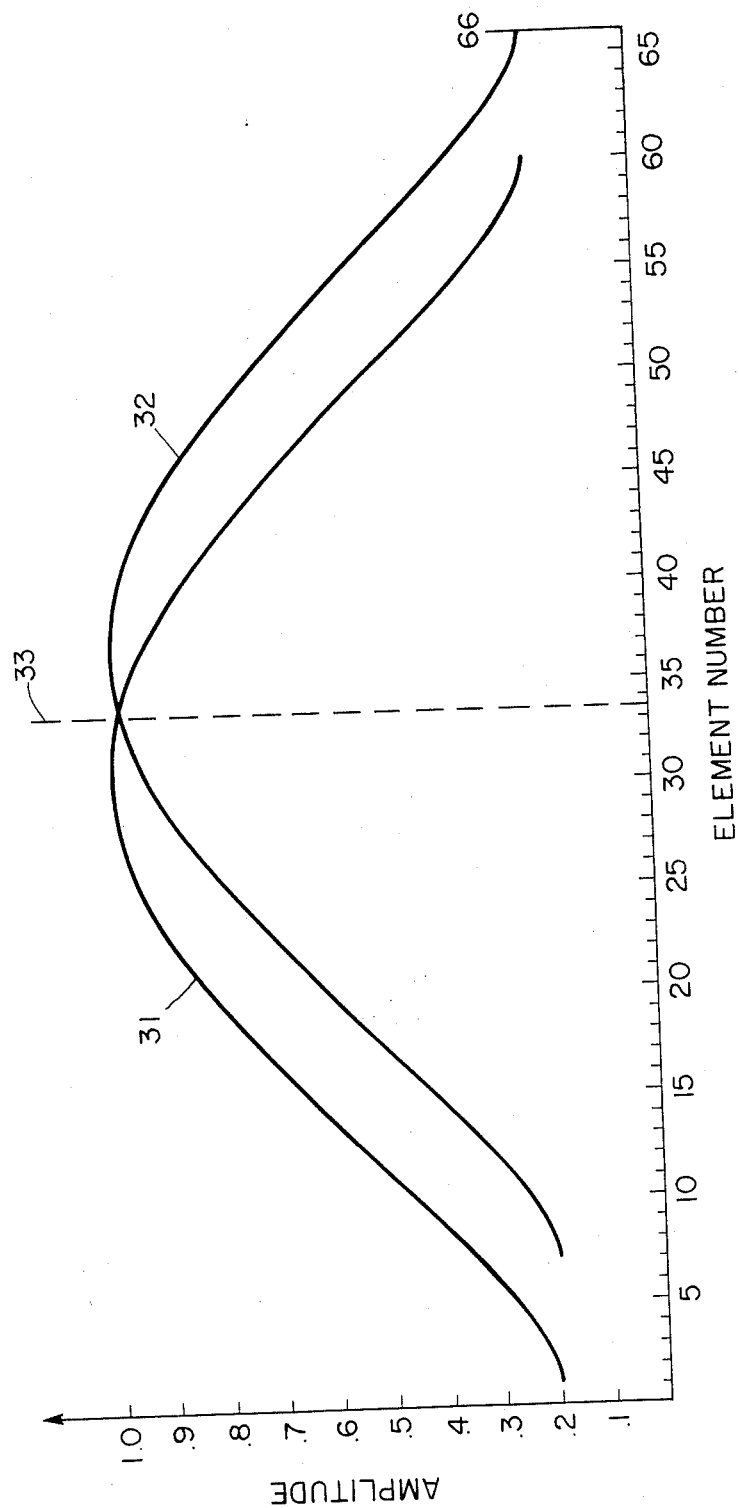
FIG. 8 shows a basic left distribution over 60 elements.
Figure 9:
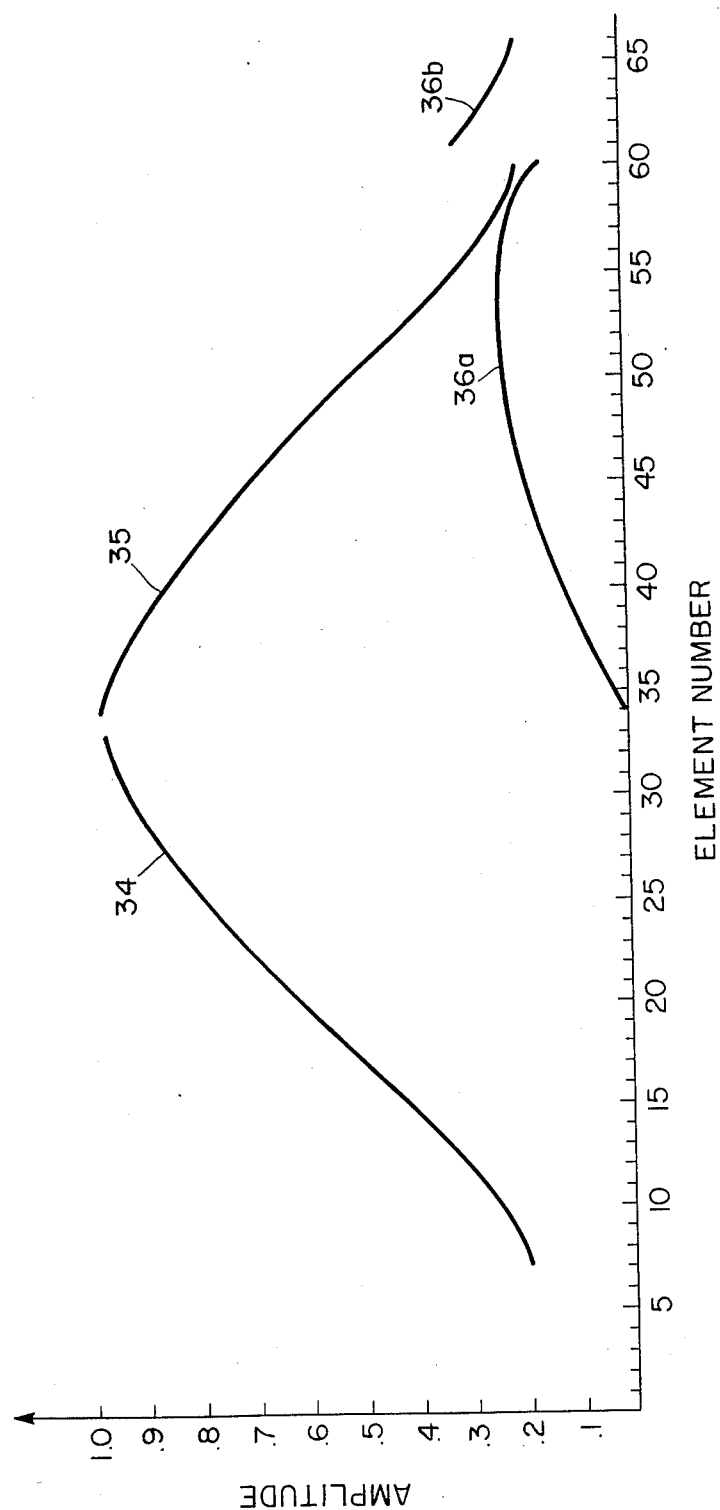
FIG. 9 shows a constant distribution formed by left and right halves.
Figure 10:
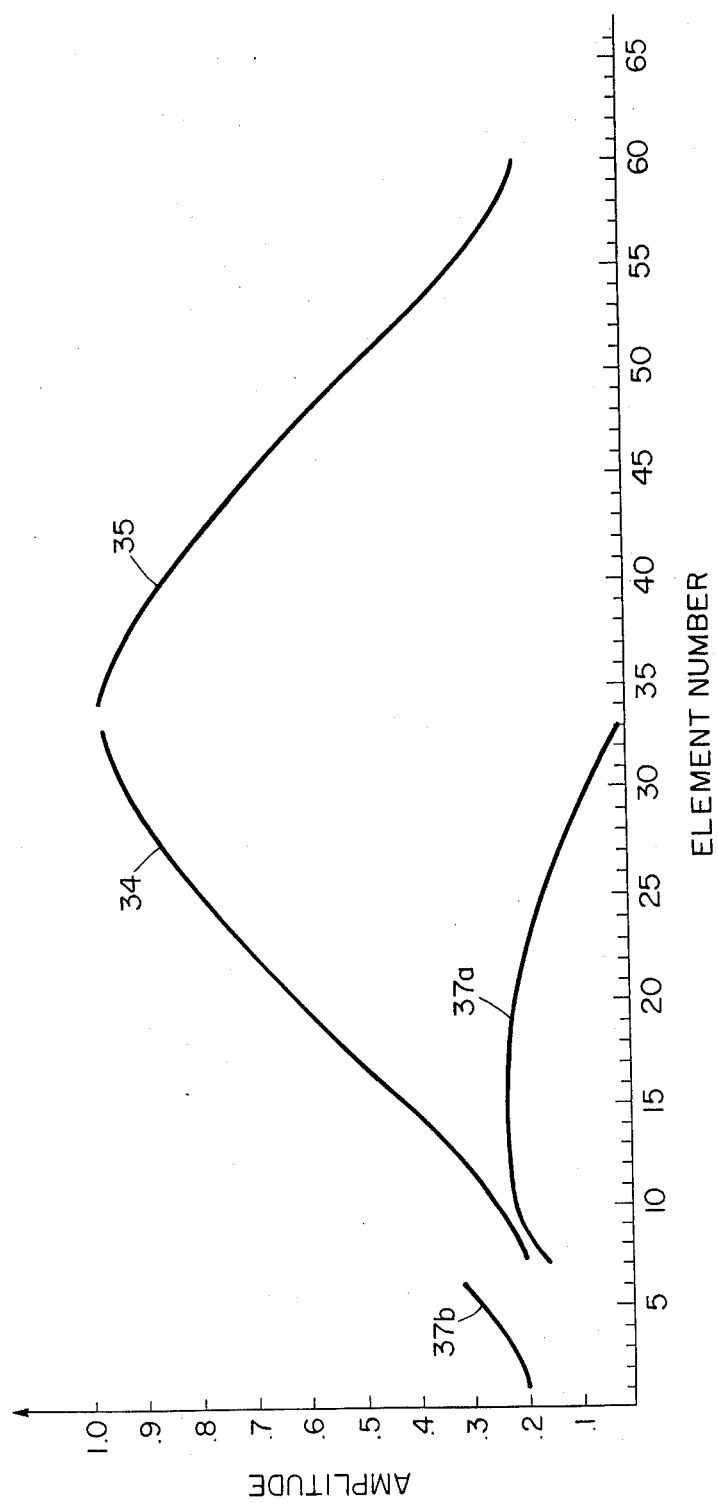
FIG. 10 shows incremented left and right distributions added to the constant distribution.
Figure 11:
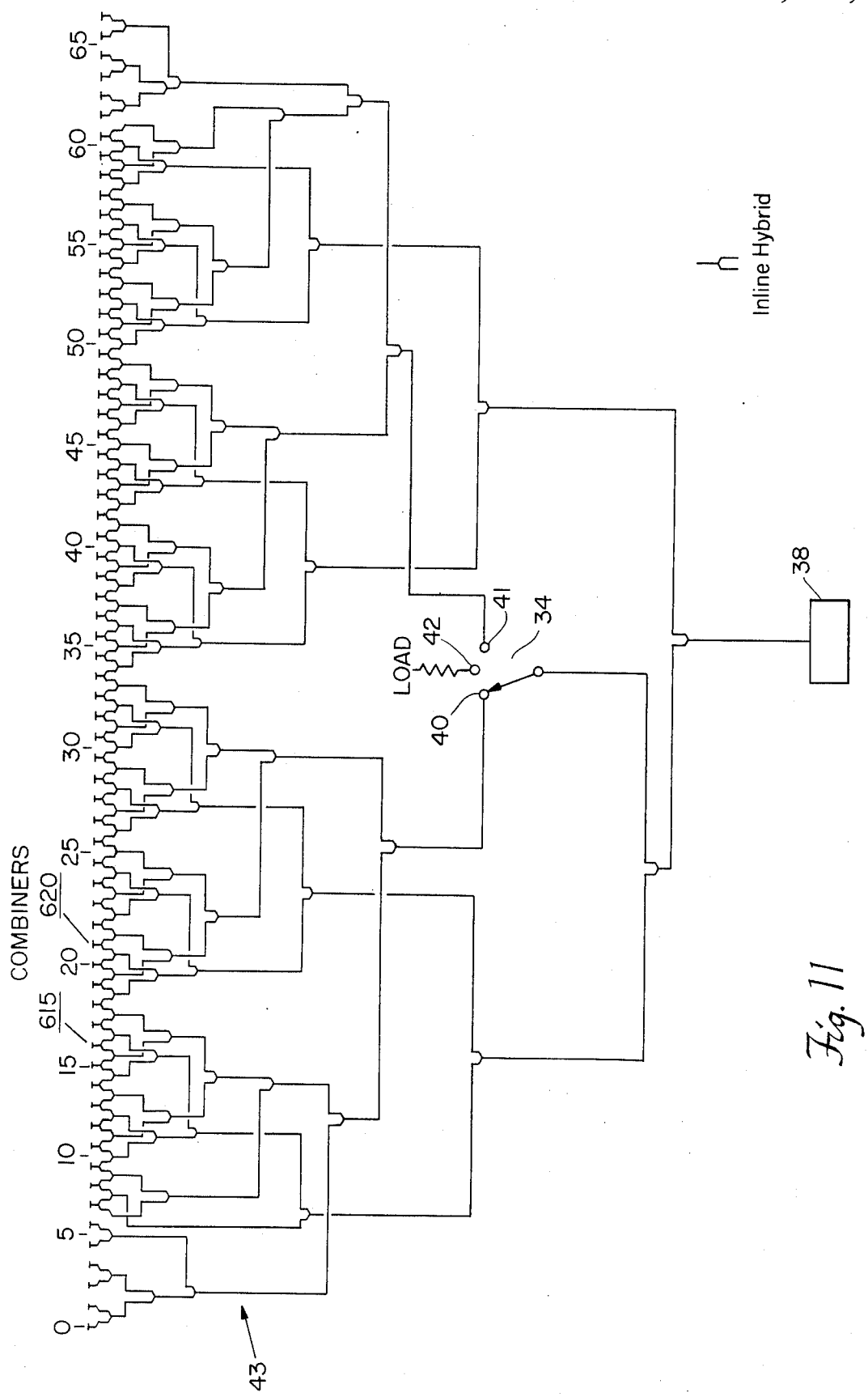
FIG. 11 shows a 60-element switched phase center array.

Improvements to the techniques described thus far in this application are shown in FIGS. 7 and 11, which reduces both the actual and the effective side lobe levels, with the aid of FIGS. 8-10. The improvement is accomplished by providing a novel microwave network. This network feeds a linear array of phased and radiating elements with a prescribed amplitude and phase characteristic, which can be translated along the array a distance equal to a preselected integral number of elements by the action of a single-pole two-throw switch, such as microwave switch 26. By adding a third switch position, an intermediate translation can be effected. The improvement in translating the prescribed distribution is accomplished basically by using a stationary distribution to which is added a switched lower power incremental distribution in a manner to be described. This configuration is shown in FIG. 7. An r.f. source 500 feeds the time invariant distribution network 501, comprising a constant network, with most of the r.f. power. A portion of the source power is fed thru the three-position single-pole switch 502 to two networks 503 and 504 supplying incremental distributions to the upper and lower halves, respectively, of the array by switch action. The constant distribution is fed to N array radiating elements thru combiners 401−400+n. The upper incremental distribution is fed to N/2 array elements thru the second combiner input, and to M-1 elements directly. Similarly the lower incremental distribution feeds the lower N/2 elements of the array thru combiners, and the lower M-1 elements directly. Switching from position 1 to position 2 moves the phase center $\Delta h$, while switching from position 2 to position 3 moves the phase center $\Delta h/2$.

The prescribed amplitude and phase distribution which is to be translated is called the "Basic Distribution" over a number of elements as desired to achieve the beam width and side lobe level and is entirely arbitrary. The novel network by virtue of its power division values in its power dividers forms the stationary distribution and the incremented distributions as explained below.

An understanding of the features of this network is aided by a labeling of the various constituents of the translatable "Basic Distribution" across the array. The "Constant Distributions" are those that are fed by the array network to the output elements of the network which in turn are fed through the phase shifters and then to the radiating elements whenever the scanning beam radiates and are in no manner time variant. The "Incremental Distributions" are those that are fed alternately to the left and right halves of the network and are summed with the "Constant Distributions" at the network output elements forming the translated "Basic Distributions". The summing of the two types of distributions at each network output element is accomplished with a microwave coupler, such as a Wilkinson inline hybrid, which forms a vector sum.

FIG. 8 shows a "Basic Left Distribution", 31, over 60 elements. This distribution is translated 6 elements to the right along the array line to produce the displaced "Basic Right Distribution", 32. In the illustrated configuration, this requires 6 additional elements for a total of 66. Note there is an axis of symmetry, 33, for the two distributions, which in this case occurs between elements 33 and 34. Note that on the left side of the array, the "Basic Left Distribution", 31, is greater in amplitude than "Basic Right Distribution", 32, and on the right side the converse exists.

Referring to FIG. 9, the "Constant Distribution" consists of two halves; a "Constant Left Distribution", 34, and a "Constant Right Distribution", 35. The "Constant Left Distribution" consists of the left half of the "Basic Right Distribution", 32, (Option A), and may include a distribution over those elements (e.g. 61−66) contributing to the right half of the "Basic Right Distribution" which do not overlap the "Basic Left Distribution", 31, such as that shown as 36b, or a fraction of 36b (Option B). Similarly the "Constant Right Distribution" consist of the right half of the "Basic Left Distribution" (Option A), and may include a distribution over those elements of the left half of the "Basic Left Distribution" which does not overlap the "Basic Right Distribution", such as 37b, (Option B). Option B may be used when the phase shifters include a built in switch for suppressing output, as is common in many MLS phased arrays. A third alternative (Option C) is a combination of options A and B, i.e. a portion of the energy in the nonoverlapping regions is in the "Constant Distribution"; the remainder is in the "Incremented Distribution". The result of using option C and a three position switch in combination with the control of the phase shifter switches in the non-overlapping elements is to produce two "Basic "Distributions" which are translated with respect to each other and a third distribution which produces a beam that is translated between the first two with a beamwidth that is very close to that produced by the "Basic Distribution".

The desired output from the network is either the "Basic Left Distribution" or "Basic Right Distribution", or a third distribution: Option C, a "Basic Center Distribution". To generate the "Basic Right Distribution", 32, note that all the elements to the left of the axis of symmetry, 33, already have the correct distribution from the constant distribution, so nothing is added to the "Constant Left Distribution", 34, for these elements. On the right side of the symmetry line we must add an "Incremented Right Distribution", 36 to the "Constant Right Distribution" to obtain the desired "Basic Right Distribution" on this side of the symmetry line. Since the "Constant Right Distribution" is equal to the "Basic Left Distribution" on this side, the increment to be added is the difference (distribution 35-distribution 31) which is shown as the "Incremented Right Distribution", 36a and 36b. Similarly, to generate the "Basic Left Distribution", 31, requires a "mirror image" operation to the operation just described, as illustrated by FIG. 10 where the "Incremented Left Distributions", 37a and 37b, are added to the "Constant Left Distribution", 34.

FIG. 11 shows the rf network 43 with output elements 101 thru 166, combiners 606–660, rf source 38 and rf switch 39, which is designed to control this summation activity. It is a corporate feed network adjusted for equal path lengths to each element, thus achieving frequency independent paths. In the case of distributions with an arbitrary output phase distribution, the maximum output phase deviation required across the network is one least significant bit of a phase shifter; any additional phase deviation required is supplied by the initial setting of the phase shifter. Thus the small phase increment required across the network outputs can be provided by additional line length as needed, which is essentially frequency independent because the induced errors would be small; i.e. a fraction of a least significant bit. For the first six and last six elements the "Constant Distributions", 34, and 35 are zero (Option A,) therefore only a single input is required for these elements. For Option B, the first six and last six elements would only require a single input but this input would be part of the "Constant Distribution"; incrementing of these elements would be accomplished by switches in the phase shifters. For the remaining elements the signal is the combined output from an inline hybrid such as the well-known Wilkinson three port which can be used for combining or dividing. For Option C, combined outputs are used symmetrically in at lest 60 elements. For combined outputs, the signals into the two input ports of the hybrid are the "Constant Distribution" value for a given element and the appropriate "Incremented Distribution" value. The complete network is a single planar circuit as shown with hybrid power dividers such as the Wilkinson, although it could be accomplished by two separate planar circuits feeding the two inputs of the element feed hybrid combiner. Of course, any of the standard hybrid power division circuits used in feed networks are equally applicable to these feed alternatives. It should be noted that the difference between Options A,B,C concerns only the feeding scheme for the first six and last six elements; for Option A it is the "Incremented Distribution", for option B it is the "Constant Distribution", and for Option C it is a combination of both distributions.

The total preferred network realization has a number of crossovers which are shown by the intersection of two feed lines. In the actual network these crossovers are accomplished by using a planar 0 db hybrid which has the crossover property and can be made in either microstrip or stripline.

The configurations thus far described, optimize the measurement process at a particular glideslope angle, for example 3 degrees. However, a more sophisticated version could provide a multiple or continuous phase center diversity program to optimize the phase center heights between "TO" and "FRO" scans as a function of beam pointing angle.

A preferred switching technique to optimize the phase center heights as a function of beam pointing angle is illustrated by FIG. 11. A switching cycle using switch positions 40 and 41 will cause a maximum movement, e.g., $\Delta h = 1$ ft, of the phase center position. This would optimize the reduction of the effective slidelobe level at a glide slope of about 3 degrees. A switching cycle using switch positions 40 and 42, or 41 and 42, would displace $\Delta h$ by only 0.5 ft, optimizing the reduction of the effective sidelobe level at a glideslope of about 6 degrees. Thus the adverse effects of sidelobe reflections could be reduced at both of these glideslopes by providing a diversity of $\Delta h$ at about 1 ft. when the beam pointing angle is below about 4.5 degrees, and a diversity of approximately 0.5 ft. when it is equal to or above that value.

An improved arrangement would use Option C; i.e., in switch position 42 there would be a constant distribution over at least the full 60 elements (equal numbers of elements on each side of the symmetry line) which would match the beamwidth of the "Basic Distribution". Option C is concerned only with the distribution in the non-overlapping regions; e.g., 36b, 37b. If this distribution is broken into the sum of two distributions (1) the preferred taper, TP1, for the switch position 42, and (2) PD1, the difference between 36b, 37b, and TP1, then PD1 becomes part of the "Incremented Distribution" and TP1 part of the "Constant Distribution". When the switch is in position 40, the phase shifters in the nonoverlapping region associated with switch position 41 are switched off, and in switch position 41, those associated with switch position 41 are switched off. All phase shifters are on in position 42.

While this improvement has been described as it applies to sidelobe activated errors to the MLS EL antenna, the technique also is applicable to mainbeam activated errors.

This invention has particular and significant applicability in the electronic navigation and landing guidance systems technologies. It provides a capability to obtain accurate measurements of azimuth and elevation angles, even in the presence of a severe multipath environment. The invention nullifies the effects of signal reflections into the measurement regions of the mainlobe, rather than to reduce the magnitudes of these reflections. This approach results in a more compact and more cost-effective multipath resistant antenna, having particular application to time reference scanning beam guidance signals.

Other embodiments are within the claims.

What is claimed is:

1. A scanning beam transmit antenna system comprising,
    a source of electromagnetic energy,
    radiating elements and phase shifters forming a linear array,
    connection means comprising a feed network for connecting said source to said radiating elements to establish a prescribed phase and amplitude characteristic thereof and including power dividers for routing said electromagnetic energy to each of said radiating elements,
    said power dividers providing a constant amplitude and phase distribution and two selectable incremental amplitude and phase distributions,
    said feed network comprising a single-pole multiple-throw microwave switch coupled to said power dividers for selectively translating said prescribed phase and amplitude characteristic along said array a distance equal to that embraced by a preselected number of said radiating elements by energizing one of said selectable incremental distributions, and
    beam steering means for controlling the phase of said electromagnetic energy at each of said radiating elements.

2. A scanning beam transmit antenna system as described by claim 1, wherein,
    said beam steering means changes the phases of the energy emitted by said radiating elements as a function of time to cause sequentially (a) a motion of said scanning beam in the "TO" direction, and (b) a motion of said scanning beam in the "FRO" direction, and
    said microwave switch increases the flow of said electromagnetic energy thru said power dividers to and among said radiating elements on one half of said linear array during the "TO" motion of said scanning beam, and to said radiating elements on the other half, of said linear array during the "FRO" motion of said scanning beam, such that the movement of the antenna phase center between a "TO" scan and a "FRO" scan approximates $\Delta h = \lambda/4 \sin \theta$, where $\Delta h$ is the change in phase center position, $\lambda$ is the wavelength of said electromagnetic energy and $\theta$ is the angle between a given direct radiation direction and the plane of a reflection surface.

3. A scanning beam transmit antenna system as described by claim 1, wherein,
    said beam steering means changes the phases of the energy emitted by said radiating elements to cause sequentially (a) a motion of said scanning beam in "TO" direction, and (b) a motion of said scanning beam in the "FRO" direction, and
    said microwave switch increases the flow of said electromagnetic energy thru said power dividers to and among said radiating elements first on one half of said linear array during a first "TO"-"FRO" scan pair motion of said scanning beam, and second on the other half of said linear array during a second "TO"-"FRO" scan pair motion,
    and cyclicly repeats said first and said second flow modification actions, such that the movement of the antenna phase center between each "TO"-"FRO" scan pair is approximately $\Delta h = \lambda/4 \sin \theta$ where $\Delta h$ is the change in phase center position, $\lambda$ is the wavelength of said electromagnetic energy and $\theta$ is the angle between a given direct radiation direction and the plane of a reflection surface.

4. A scanning beam transmit antenna system as described by claim 1, wherein,
    said beam steering means changes the phases of the energy emitted by said radiating elements to cause sequentially (a) a motion of said scanning beam in "TO" direction, and (b) a motion of said scanning beam in the "FRO" direction, and
    said microwave switch selectively modifies at two specific beam pointing angles, the flow of said electromagnetic energy thru said power dividers to and among said radiating elements, in relation to the specific beam angles generated by said beam steering means, such that the movement of the antenna phase center between a "TO" scan and a "FRO" scan occurs in two steps, the first step $\Delta h$ occurring at lower scan angles, and the second step $h1 = \Delta h/2$ occurring at higher scan angles such that the movement $\Delta h$ of the phase center is approximately $\Delta h = \lambda/4 \sin \theta$ where $\Delta h$ is the change in phase center position, $\lambda$ is the wavelength of said electromagnetic energy and $\theta$ is the angle between a given direct radiation direction and the plane of a reflecting surface.

5. A scanning beam system as described by claim 1, wherein said feed network comprises,
    a first feed sub-network including power dividers permanently connected to said source of electromagnetic energy to provide a fixed constant phase and amplitude distribution derived from portions of a desired initial phase and amplitude distribution and the same distribution translated along a number of said elements corresponding to a phase center movement,
    combiners common to both said initial and translated distributions feeding said constant distribution to all said radiating elements continuously,
    a second feed sub-network including power dividers selectively connected to said source of electromagnetic energy to provide a phase and amplitude distribution which is the difference between a desired initial phase and amplitude distribution and the derived constant distribution provided by said first feed sub-network,
    said second feed sub-network directly feeding those radiating elements in a first half of said array not fed by the constant distribution and the remaining radiating elements in said first half thru the remaining unused inputs of said combiners associated with said first half,
    a third feed sub-network including power dividers selectively connected to said source of electromagnetic energy to provide a phase and amplitude distribution which is the difference between a desired translated phase and amplitude distribution and the derived constant distribution provided by said first feed sub-network, said third feed sub-network directly feeding those radiating elements in a second half of said array not fed by said constant distribution and the remaining radiating elements in said second half being fed by said third feed sub-network thru the remaining unused inputs of combiners associated with said second half, and comprising also said microwave switch to activate in programmed sequence, said second feed sub-network, or said third feed sub-network to accomplish the movement of the phase center $\Delta h$ of a chosen amplitude and phase distribution.

6. A scanning beam system as described by claim 5, wherein said microwave switch comprises, switching means for programmed positions to (1) deactivate said second feed sub-network and said third feed subnetwork simultaneously or (2) activate only said second feed sub-network or (3) activate only said third feed sub-network to accomplish the movement $\Delta h/2$ of the antenna phase center from position 1 to 2, or the movement $\Delta h$ of the antenna phase center position from 2 to position 3.

7. A scanning beam system as described by claim 2, wherein said feed network comprises, a first feed sub-network including power dividers permanently connected to said source of electromagnetic energy to provide a fixed constant phase and amplitude distribution derived from portions of a desired initial phase and amplitude distribution and the same distribution translated along a number of said elements corresponding to a phase center movement, combiners common to both said initial and translated distributions feeding said constant distribution to all said radiating elements continuously, a second feed sub-network including power dividers selectively connected to said source of electromagnetic energy to provide a phase and amplitude distribution which is the difference between a desired initial phase and amplitude distribution and the derived constant distribution provided by said first feed sub-network, said second feed sub-network directly feeding those radiating elements in a first half of said array not fed by the constant distribution and the remaining radiating elements in said first half thru the remaining unused inputs of said combiners associated with said first half, a third feed sub-network including power dividers selectively connected said source of electromagnetic energy to provide a phase and amplitude distribution which is the difference between a desired translated phase and amplitude distribution and the derived constant distribution provided by said first feed sub-network, said third feed sub-network directly feeding those radiating elements in a second half of said array not fed by said constant distribution and the remaining radiating elements in said second half being fed by said third feed sub-network thru the remaining unused inputs of combiners associated with said second half, and comprising also said microwave switch to activate in programmed sequence, said second feed sub-network, or said third feed sub-network to accomplish the movement of the phase center $\Delta h$ of a chosen amplitude and phase distribution.

8. A scanning beam system as described by claim 3, wherein said feed network comprises, a first feed sub-network including power dividers permanently connected to said source of electromagnetic energy to provide a fixed constant phase and amplitude distribution derived from portions of a desired initial phase and amplitude distribution and the same distribution translated along a number of said elements corresponding to a phase center movement, combiners common to both said initial and translated distributions feeding said constant distribution to all said radiating elements continuously, a second feed sub-network including power dividers selectively connected to said source of electromagnetic energy to provide a phase and amplitude distribution which is the difference between a desired initial phase and amplitude distribution and the derived constant distribution provided by said first feed sub-network, .said second feed sub-network directly feeding those radiating elements in a first half of said array not fed by the constant distribution and the remaining radiating elements in said first half thru the remaining unused inputs of said combiners associated with said first half, a third feed sub-network including power dividers selectively connected said source of electromagnetic energy to provide a phase and amplitude distribution which is the difference between a desired translated phase and amplitude distribution and the derived constant distribution provided by said first feed sub-network, said third feed sub-network directly feeding those radiating elements in a second half of said array not fed by said constant distribution and the remaining radiating elements in said second half being fed by said third feed sub-network thru the remaining unused inputs of combiners associated with said second half, and comprising also said microwave switch to activate in programmed sequence, said second feed sub-network, or said third feed sub-network to accomplish the movement of the phase center $\Delta h$ of a chosen amplitude and phase distribution.

9. A scanning beam system as described by claim 2, wherein said feed network comprises, a first feed sub-network including power dividers permanently connected to said source of electromagnetic energy to provide a fixed constant phase and amplitude distribution derived from portions of a desired initial phase and amplitude distribution and the same distribution translated along a number of said elements corresponding to a phase center movement, combiners common to both said initial and translated distributions feeding said constant distribution to all said radiating elements continuously, a second feed sub-network including power dividers selectively connected to said source of electromagnetic energy to provide a phase and amplitude distribution which is the difference between a desired initial phase and amplitude distribution and the derived constant distribution provided by said first feed sub-network, said second feed sub-network directly feeding those radiating elements in a first half of said array not fed by the constant distribution and the remaining radiating elements in said first half thru the remaining unused inputs of said combiners associated with said first half, a third feed sub-network including power dividers selectively connected said source of electromagnetic energy to provide a phase and amplitude distribution which is the difference between a desired translated phase and amplitude distribution and the derived constant distribution provided by said first feed sub-network, said third feed sub-network directly feeding those radiating elements in a second half of said array not fed by said constant distribution and the remaining radiating elements in said second half being fed by said third feed sub-network thru the remaining unused inputs of combiners associated with said second half, and comprising also said microwave switch to activate in programmed sequence, said second feed sub-network, or said third feed sub-network to accomplish the movement of the phase center $\Delta h$ of a chosen amplitude and phase distribution.

10. A scanning beam system as described by claim 7, wherein said microwave switch comprises, switching means for programmed positions to (1) deactivate said second feed sub-network and said third feed subnetwork simultaneously or (2) activate only said second feed sub-network or (3) activate only said third feed sub-network to accomplish the movement of $\Delta h/2$ of the antenna phase center from position 1 to 2, or the movement $\Delta h$ of the antenna phase center position from 2 to position 3.

11. A scanning beam system as described by claim 8, wherein said microwave switch comprises, switching means for programmed positions to (1) deactivate said second feed sub-network and said third feed subnetwork simultaneously or (2) activate only said second feed sub-network or (3) activate only said third feed sub-network to accomplish the movement $\Delta h/2$ of the antenna phase center from position 1 to 2, or the movement $\Delta h$ of the antenna phase center position from 2 to position 3.

12. A scanning beam system as described by claim 9, wherein said microwave switch comprises, switching means for programmed positions to (1) deactivate said second feed sub-network and said third feed subnetwork simultaneously or (2) activate only said second feed sub-network or (3) activate only said third feed sub-network to accomplish the movement $\Delta h/2$ of the antenna phase center from position 1 to 2, or the movement $\Delta h$ of the antenna phase center position from 2 to position 3.

13. A scanning beam system as described by claim 10, wherein said microwave switch comprises, switching means for programmed positions to (1) deactivate said second feed sub-network and said third feed subnetwork simultaneously or (2) activate only said second feed sub-network or (3) activate only said third feed sub-network to accomplish the movement $\Delta h/2$ of the antenna phase center from position 1 to 2, or the movement $\Delta h$ of the antenna phase center position from 2 to position 3.

* * * * *